Aug. 17, 1926. 1,596,026
I. P. SCHEI
DEVICE FOR UNIFORMLY DISTRIBUTING WHEAT IN BINS
Filed Feb. 16, 1925
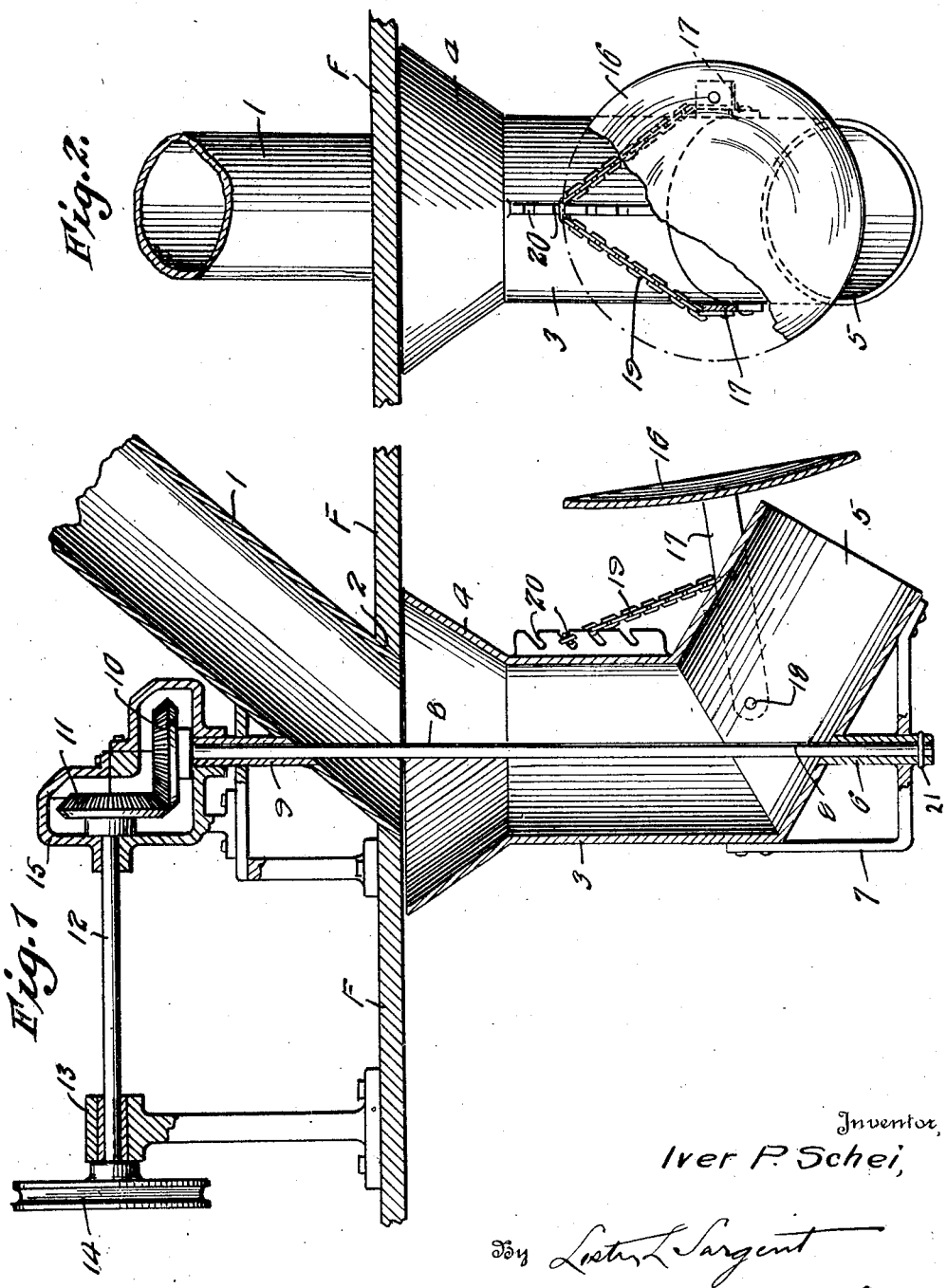
Inventor,
Iver P. Schei,
By Lester L. Sargent
Attorney.

Patented Aug. 17, 1926.

1,596,026

UNITED STATES PATENT OFFICE.

IVER P. SCHEI, OF FERGUS FALLS, MINNESOTA.

DEVICE FOR UNIFORMLY DISTRIBUTING WHEAT IN BINS.

Application filed February 16, 1925. Serial No. 9,452.

The object of my invention is to provide an apparatus for keeping wheat from dividing or separating as it falls into the bin, thereby ensuring uniformity of grinding and obtaining a better yield; and to provide means for adjusting the device and thus controlling the distribution of the wheat. I attain these and other objects of my invention by the apparatus illustrated in the accompanying drawings, in which—

Figure 1 is a vertical section through my device; and

Fig. 2 is a front elevational view, a portion of the disk 16 being broken away and arm 17 being broken away.

Like numerals indicate like parts in each of the several views.

Referring to the accompanying drawings, I provide a feed spout 1 mounted in an opening 2 in floor F and discharging into the funnel portion 4 of spout 3, the latter member terminating in the inclined discharge spout 5. I provide a bracket or brace 7 affixed to members 3 and 5 and to the socket 6 to which the rod 8 is affixed by suitable pins 21, or in any other desirable manner. I provide a suitable bearing 9 in which the upper portion of the rod 8 may rotate, this bearing 9 being mounted in the housing 15 in which are contained the gears 10 and 11. Gear 10 is affixed to rod 8 and meshes with gear 11, which latter gear is affixed to the driven shaft 12; shaft 12 in turn being affixed to the driven pulley or gear 14 which may be driven from any suitable source of power. I provide a suitable bearing 13 in which the shaft 12 is mounted.

Mounted on spout 5 by means of pivots 18 are arms 17 which are affixed to the preferably curved disk 16, which disk is swingable over the mouth of discharge spout 5, but is spaced from said mouth, as shown. I provide a suitable chain 19 fastened to arms 17. I also provide a ratchet bar 20 mounted on spout 3. In any of the notches of bar 20 the chain 19 may be engaged to hold the disk 16 in the desired adjusted position relative to the mouth of discharge spout 5 for discharging the grain with the light wheat and heavy wheat together uniformly over and level in the mill bin.

In operating the invention the gear or pulley 14 is connected with any suitable source of power and power is thus transmitted to shaft 8 which being affixed to socket 6 causes the rotation of funnel spouts 4, 3, and 5. Grain is fed through feed spout 1 to funnel 4 and thence to spouts 3 and 5, being discharged in a circle evenly all over the bin. The operation of the device can be regulated by adjusting the position of disk 16 relative to the discharge opening of spout 5 and by increasing or decreasing the speed of rotation of the funnel spouts. The device eliminates the trouble in milling which has heretofore been caused by an uneven distribution of the grain. The rate of revolution of the device may vary from ten revolutions to 100 revolutions per minute. Ordinarily when the wheat strikes the bulk of the wheat in the bin the light grains of wheat will slide off to the side and in drawing the bin down the light wheat will come by itself after the heavy wheat has been drawn off. It is to eliminate this condition that my device is used. It has been found that this device evenly distributes the wheat as it falls into the bin, thereby keeping uniformity for grinding and obtaining a closer and better yield with a resulting improvement in the uniformity and quality of the flour produced from the wheat when milled.

Applicant's machine is designed to prevent light wheat from getting separated from heavier wheat as it is spouted into the mill bin. While it functions as a centrifugal machine, its centrifugal action is counteracted by an adjustable plate which counteracts the centrifugal effect and functions to cause an even distribution of the light and heavy wheat in the bin. This result is necessary inasmuch as if wheat is unevenly distributed in the mill bin the miller is the loser, and this machine is designed for the benefit of millers. Devices heretofore invented which use the full centrifugal or nearly the full centrifugal force are likely to break the wheat kernels and would bring the product into a low class such as screenings, thus involving serious loss to the miller. Applicant's machine is designed as an improvement over such machines.

What I claim is:

1. In a device for uniformly distributing wheat in bins, the combination of a funnel terminating in a downwardly discharging spout, means for rotating the funnel, a disc having a convex face positioned in proximity to, but spaced from, the discharge end of the funnel spout and disposed in a plane to intercept and divert material flowing from the spout, arms affixed to the disc and operatively mounted on the funnel spout, a chain attached to said arms, a ratchet bar to which the chain may be detachably engaged for adjusting the position of the disc relative to the lower portion of the mouth of the discharge spout for the purpose of effecting even distribution of light and heavy wheat in the mill bin.

2. In combination with the apparatus described in claim 1, a vertical rod for rotatably supporting the same, said rod carrying a gear at its upper end and power driven means engaging said gear to drive same at a desired slow speed from any suitable source of power.

3. In a device for uniformly distributing wheat in bins, the combination of a funnel, the funnel having an elbow and a slantingly-disposed spout portion in which the funnel terminates, a vertical rod extending centrally downward through the funnel and having its end fixedly attached to the lower portion of the slantingly disposed spout portion of the funnel, said rod carrying a gear at its upper end, and power driven means engaging said gear to drive same at a desired slow speed from any suitable source of power.

4. In a device for uniformly distributing wheat in bins, the combination of a funnel revolubly mounted under a grain feeding spout, said funnel having an elbow portion, and having a slantingly-disposed spout portion extending a substantial distance from the elbow to discharge the grain in a lateral direction, the aforesaid slanting spout portion having a socket on its underside approximately under the center of the vertical portion of the funnel, a brace affixed to said socket and to the funnel to reenforce same, a rod rigidly mounted in the socket, said rod extending upward through the vertical portion of the funnel and revolubly supporting same, means for rotating the rod mounted on the upper end of said rod, and power driven means operatively connected with said means on the upper end of the rod for driving same at a desired slow speed from a suitable source of power.

IVER P. SCHEI.